March 3, 1931.  A. MEISSNER  1,794,723
METHOD AND MEANS TO DAMP MECHANICALLY VIBRATING BODIES
Filed April 6, 1927
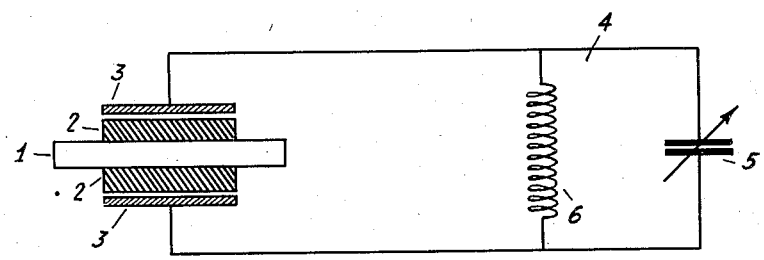
INVENTOR
ALEXANDER MEISSNER
BY
ATTORNEY Patented Mar. 3, 1931

1,794,723

UNITED STATES PATENT OFFICE

ALEXANDER MEISSNER, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY

METHOD AND MEANS TO DAMP MECHANICALLY-VIBRATING BODIES

Application filed April 6, 1927, Serial No. 181,463, and in Germany April 8, 1926.

It is well known that a mechanically oscillating body for instance such as a crystal, possesses very little damping. This low amount of damping constitutes a disturbing element in a great number of devices in which vibrating crystals are used, as for instance light control devices, for the reason that the time constant is unduly high for rapid control actions.

The present invention pertains to a method whereby such mechanically oscillating bodies may be damped.

If the oscillating body consists of a piezoelectric crystal, then as is well known electrical charging is produced under the influence of the mechanical vibrations. If with such a body an electrical system is connected in such a manner that the electrical energy created by the mechanical oscillations is imparted or fed to the said electrical system, an increase in damping of the vibrating body will take place. Therefore, by connection of any body with a piezo-electric crystal it is possible to cause damping of its oscillations.

If the oscillating body is not inherently piezo-electric the damping of such body may be accomplished according to the drawing in which the figure represents a means whereby a body is united with a piezo electric body so that the piezo electric body may be set into vibrations whereupon electrical energy is supplied from the crystal to an electrical system.

As shown in the figure the electrical system may consist of an oscillation circuit 4 tuned to the frequency of the oscillator by means of the condenser 5 and the coil 6. However it is sufficient in some cases to connect a resistance or a condenser, or a self-inductance coil with the piezo-electric bodies.

A good plan is to have recourse to the arrangement illustrated in which 1 is the body to be damped, 2 is a piezo electric crystal or body connected more or less closely with the body to be damped, 3 are the usual elecrodes which are disposed on the piezo-electric body and to which the electrical oscillating circuit 4 is connected. In the case shown it is suitable to tune the said oscillation circuit to the natural period of the oscillatory system comprising body 1 to be damped and the crystals.

Having thus described my invention I claim as new:—

1. A method for damping mechanically vibrating bodies which consists in transferring the vibrations of said bodies to a piezo-electric crystal and transferring the electrical energy produced thereby to an electrical system tuned to the frequency of the vibrations.

2. The method of damping mechanically vibrating bodies which comprises transferring the vibrations of said bodies to a piezoelectric crystal, and transferring the electrical energy produced thereby to an electrical system.

3. The method of damping mechanically vibrating bodies which comprises transferring the vibrations of said bodies to a piezoelectrical crystal, and transferring the electrical energy produced thereby to a tunable electrical system.

4. A device for damping the vibrations of a mechanically vibrating body comprising, a piezo-electric body connected to said vibrating body, said piezo-electric body being adapted to be vibrated by the vibrations of said vibratory body, said piezo-electric body producing as a result of the mechanical vibrations thereof electrical oscillations, and means to absorb said electrical oscillations.

5. A device for damping the mechanical vibrations of a vibrating body which comprises in combination, means to absorb at least a portion of the energy of said vibrations and to convert at least a portion of said absorbed energy into electrical energy, and means to absorb said electrical energy.

ALEXANDER MEISSNER.